US011838272B2

(12) United States Patent
Mihatsch et al.

(10) Patent No.: US 11,838,272 B2
(45) Date of Patent: Dec. 5, 2023

(54) VPN ESTABLISHMENT (71) Applicant: Virtual Solution AG, Munich (DE)

(72) Inventors: Oliver Mihatsch, Munich (DE); Falko Lehmann-Carpzov, Munich (DE)

(73) Assignee: MATERNA VIRTUAL SOLUTION GMBH, Munich (DE)

( * ) Notice: Subject to any disclaimer, the term of this patent is extended or adjusted under 35 U.S.C. 154(b) by 267 days.

(21) Appl. No.: 17/109,764

(22) Filed: Dec. 2, 2020

(65) Prior Publication Data
US 2022/0174043 A1 Jun. 2, 2022

(51) Int. Cl.
*H04L 29/06* (2006.01)
*H04L 9/40* (2022.01)
*H04L 9/32* (2006.01)

(52) U.S. Cl.
CPC ........ *H04L 63/0272* (2013.01); *H04L 9/3213* (2013.01); *H04L 9/3234* (2013.01); *H04L 2209/80* (2013.01)

(58) Field of Classification Search
CPC . H04L 63/0272; H04L 9/3213; H04L 9/3234; H04L 2209/80
See application file for complete search history.

(56) References Cited

U.S. PATENT DOCUMENTS

| | | | | |
|---|---|---|---|---|
| 8,438,631 B1 * | 5/2013 | Taylor | ................. | H04W 12/068 726/15 |
| 2006/0212937 A1 | 9/2006 | Natarajan | | |
| 2007/0271606 A1 * | 11/2007 | Amann | ................. | H04W 12/02 726/15 |
| 2012/0023325 A1 * | 1/2012 | Lai | .......................... | H04L 63/08 713/155 |
| 2012/0173680 A1 * | 7/2012 | Coskun | ................. | H04L 67/306 709/220 |
| 2013/0297933 A1 | 11/2013 | Fiducia et al. | | |
| 2014/0109174 A1 | 4/2014 | Barton et al. | | |
| 2017/0099159 A1 * | 4/2017 | Abraham | ................ | H04L 45/54 |
| 2018/0109541 A1 * | 4/2018 | Gleichauf | ............... | H04W 8/24 |

FOREIGN PATENT DOCUMENTS

EP 2629570 8/2013
WO WO-2007059624 A1 * 5/2007 ............. G06F 21/41

OTHER PUBLICATIONS

Saha, Amal, and Sugata Sanyal. "Review of considerations for mobile device based secure access to financial services and risk handling strategy for CIOs, CISOs and CTOs." arXiv preprint arXiv:1502.00724 (2015). (Year: 2015).*

European Patent Office, "Extended European Search Report," issued in connection with European Patent Application No. 20211287.6, dated Apr. 28, 2021, 10 pages.

* cited by examiner

*Primary Examiner* — Shawnchoy Rahman
(74) *Attorney, Agent, or Firm* — HANLEY, FLIGHT & ZIMMERMAN, LLC (57) ABSTRACT

The present invention relates to a system for establishing a secure connection between a mobile device container and a number of virtual private networks.

15 Claims, 8 Drawing Sheets

VPN ESTABLISHMENT

FIELD

The present invention generally relates to information technology. More specifically, the present invention is directed to establishing a secure connection between a mobile device container and a number of virtual private networks (VPN).

BACKGROUND

Mobile device containers act as an additional space within mobile devices. Mobile device containers serve to delimit and protect applications, data, and processes within the mobile device container from those outside of the mobile device container. This delamination between within and outside of mobile device containers has also be complied with when establishing a VPN connection.

DESCRIPTION

The present invention relates to a system for establishing a secure connection between a mobile device container and a number of VPN. The system comprises a mobile device container which is configured to isolate a portion of a mobile device from another portion of the mobile device. The system also comprises a number of VPN, where each of the number of VPN has a VPN profile. Further, the system comprises a cryptographic token which is configured to provide at least part of the VPN profile of at least one of the number of VPN. The system also comprises a communication link which is configured to link the mobile device container and the cryptographic token. In order to establish a secure connection to the at least one VPN of the number of VPN, the mobile device container is configured to access at least part of the VPN profile of the VPN of the at least one VPN of the number of VPN through the communication link which is configured to link the mobile device container and the cryptographic token.

Preferably, "VPN" is used herein to indicate a logical network which is established between a client and a server and potential further participants. Further participants of the VPN may comprise gateways, further servers or services. By establishing the logical network between the client and the server and potential further participants, the client itself may become a participant of the VPN. The mobile device container may be a client of a VPN. The mobile device container may become a participant of the VPN.

A secure connection may generally comprise a connection which prevents third parties from unauthorized accessing, reading or interfering with the connection or any communication within the connection. A secure connection may refer to a safe channel between the mobile device container and one of the participants of the VPN where any tracking activity from outside is impossible. A secure connection may comprise a VPN tunnel.

The number of VPN may comprise at least one VPN. The number of VPN may depend on the VPN architecture the mobile device container is to be connected to. For instance, when a mobile device container of a user is to be connected to the VPN of the user's company department, the mobile device container may first be connected to the company's general VPN before the department's VPN can be accessed. In this case, the number of VPN equals two. The number of VPN may depend on the internal organization of a company, government, educational institution, or another entity. The number of VPN may be modified in cases where the mobile device container is to be securely connected to less/more VPN.

The number of VPN may be configured to any of a multi-hop VPN, a double-hop VPN, a chaining VPN, a cascading VPN, and subsequent VPN.

Each of the number of VPN may comprise any of a private network, a VPN, a proxy, a gateway proxy, a tunneling proxy, a reverse proxy, a gateway proxy, a bridge proxy, a network socket. For further details on the gateway proxy, it is referred to European Patent Application EP3544252A1 which is hereby incorporated by reference.

The mobile device container may create an isolated space within a mobile device. The mobile device container may allow for strict division between the mobile device container and the remaining mobile device. Data inside the container may be stored and transferred encrypted. Applications within the mobile device container such as calendar, e-mail, contacts may run completely separately from those outside the container. A mobile device container may thus unite two separate use cases, for instance private use and business use, on one mobile device. Therefore, mobile device container can cater to companies, governments, educational institution, and other entities for temporary external workers, and policies such as Bring Your Own Device (BYOD), or Corporate Owned, Personally Enabled (COPE) and more.

Access to the mobile device itself may not yet allow access to the mobile device container. Access to the mobile device container may require additional credentials. The mobile device container may protect information and data independently from an underlying operating system.

The mobile device container may be implemented as an application, software and/or hardware within a mobile device. A mobile device may comprise any device that is principally movable. It may comprise computer, laptop computer, portable computer, tablet computer, smartphones, smartwatches, and eBook reader.

The cryptographic token may be configured to provide at least part of the VPN profile of at least one of the number of VPN. Alternatively, or in addition thereto, the cryptographic token may provide the full VPN profile of at least one of the number of VPN. Alternatively or in addition thereto, the cryptographic token may provide at least part of each of the VPN profile of each of the number of VPN. Alternatively, or in addition thereto, the cryptographic token may provide the full VPN profile of each of the number of VPN.

The cryptographic token may be configured for single use. In this case, accessing at least part of the VPN profile of the VPN may also comprise extracting the accessed at least part of the VPN profile to the mobile device container. Thereby, the at least part of the VPN profile may be permanently accessible by the mobile device container.

At least part of the VPN profile may be stored on the cryptographic token complying with the Cryptographic Token Information Syntax Standard PKCS #15. At least part of the VPN profile may be stored on the cryptographic token complying with the FIPS 201-2 PIV (Personal Identity Verification) Standard. In addition, or alternatively, at least part of the VPN profile may be parsed and stored in unused space of the cryptographic token. In addition, or alternatively, a further part of the VPN profile may be parsed and stored in unused space of the cryptographic token. The mobile device container may comprise instructions on how to access the further part of the VPN profile that has been previously parsed and stored in unused space of the cryptographic token.

Cryptographic token may contain storage areas where at least part of the VPN profile may be stored. This part of the VPN profile may relate to information such as secret key material. In some example, this secret key material may be private key material, public key material, X.509 certificates or other data. This storage area may normally not processed by the token during normal operation.

The VPN profile may serve for authentication of the mobile device container towards the VPN. A full VPN profile may be required for successful authentication. Authentication may be assured by any or any combination of legitimate possession of the VPN profile, physical or biometric features of the user of the mobile device container, generic secret between the mobile device container and the VPN. The VPN profile may comprise classified information.

The VPN profile of each of the number of VPN may comprise at least one of: a challenge response authentication, user identification (ID), mobile device ID, mobile device container ID, a cryptographic key, an encrypted key, a private key, a public key, a certificate, public key certificate, generic secret, personal identification number (PIN), password, one-time password, application programming interface (API) key, API token, biometric identification, fingerprint identification, palm veins identification, face identification, DNA identification, palmprint identification, iris identification, hand geometrics identification, retina identification, voice ID identification. The VPN profile may be any of non-encrypted, asymmetrically or symmetrically encrypted.

The VPN profile of each of the number of VPN may further comprise at least one of: VPN server information, port number, hostname, network address, target system, configuration information, time-out information, compression information, IP address, identification number. The VPN profile may be provided in plaintext and/or cyphertext. The cyphertext may be the result of asymmetrical or symmetric encryption.

The cryptographic token may be provided by at least one of: a smart card, an integrated circuit card (ICC), a universal serial bus (USB) medium, a quick response (QR) code, an optical medium, an audio medium, a photographic medium, a holographic medium, a transaction authentication number (TAN) generator, a smart watch, a near field communication (NFC) medium, a radio-frequency identification (RFID) medium, a user.

The communication link may comprise at least one of: Bluetooth, a wired card reader, a wireless card reader, NFC, RFID, a body area network (BAN), a biometric recognition device, an optical recognition device, optical pairing, a QR recognition device, a fingerprint recognition device, a palm veins recognition device, a face recognition device, a DNA recognition device, a palmprint recognition device, an iris recognition device, a hand geometrics recognition device, a retina recognition device, a voice ID recognition device.

The cryptographic token may further comprise an unlocking mechanism for unlocking by the mobile device container. The unlocking mechanism may initiate a graphical user interface which may prompt a user of the mobile device container to PIN entering or fingerprint scanning.

The at least part of the VPN profile may be manually deployed to the cryptographic token by a network administrator. Alternatively, or in combination thereto, the at least part of the VPN profile may be deployed to the cryptographic token within batch processing.

The system may further comprise an additional cryptographic token. The system may be configured to provide a further part of the VPN profile to establish a secure connection to the VPN of the number of VPN. The further part of the VPN profile may be provided by at least one of the following: mobile device container, the VPN of the number of VPN, the communication link, and the additional cryptographic token.

In case the additional cryptographic token may be provided by the mobile device container, the additional token may be manually deployed by an administrator, automatically deployed during configuration of the mobile device container (e.g. via a mobile device management) or may be part of the installation package. Alternatively, or in addition thereto, the additional cryptographic token may also be retrieved from a network resource available after connecting and joining a preceding VPN of the number of VPN.

The cryptographic token may be configured to indicate to the mobile device container where and/or how to access the further part of the VPN profile within the system. Alternatively, or in combination thereto, the mobile device container may comprise information on where and/or how to access the at least part and the further part of the VPN profile within the system.

In order to establish a secure connection to a subsequent VPN, the system may be further configured to selectively provide at least part of the VPN profile of the subsequent VPN only if the connection between the mobile device container and the VPN has been successfully established.

"Selectively provided" may be used herein to indicate a mechanism which unlocks and/or activates the VPN profile of the subsequent VPN upon feedback that the secure connection to the VPN, that is to say the VPN which precedes the subsequent VPN, has been successfully established. The mechanism may comprise logic, a flag, arithmetic processes, registers, or the like. This mechanism may further enhance security of processing VPN profiles in that it hides at least part of the VPN profile of the subsequent VPN until the mobile device container has already successfully proved authentication to a related VPN. This mechanism may be particularly employed for VPN profiles that comprise classified information. In figurative terms, "selectively provided" could be illustrated by a sequence of doors whereat at least part of the key and/or address for second next door is only provided after the next door.

An implementation of "selectively provided" may use different sets of cryptographic tokens to access the subsequent VPN. The different sets of cryptographic tokes may be multi-use, single-use or only valid for a certain time. In one example, the mobile container may have access to a cryptographic token (a) and an additional cryptographic token (b). The mobile device container may use token (a) to connect and access VPN1. The mobile container may now be able to connect and authenticate using cryptographic token (b) to an internal service only reachable via VPN1 which may provide another cryptographic token for single use (c). The mobile container may then use the single-use cryptographic token (c) to connect and access VPN2.

"Successfully established" may be used herein to indicate that the mobile device container has authenticated itself towards the VPN and has been securely connected to the VPN. Thereupon, the mobile device container and/or other components of the system may receive a corresponding feedback which in turn might be necessary for unlocking and/or activating the VPN profile of the subsequent VPN.

At least part of the VPN profile of the subsequent VPN may be selectively provided by at least one of the following: the cryptographic token, the mobile device container, the VPN of the number of VPN, the communication link, and the additional cryptographic token.

The additional cryptographic token may be provided by at least one of: a smart card, an integrated circuit card (ICC), a universal serial bus (USB) medium, a quick response (QR) code, an optical medium, an audio medium, a photographic medium, a holographic medium, a transaction authentication number (TAN) generator, a smart watch, a near field communication (NFC) medium, a radio-frequency identification (RFID) medium, a user.

The additional communication link may comprise at least one of: Bluetooth, a wired card reader, a wireless card reader, NFC, RFID, a body area network (BAN), a biometric recognition device, an optical recognition device, optical pairing, a QR recognition device, a fingerprint recognition device, a palm veins recognition device, a face recognition device, a DNA recognition device, a palmprint recognition device, an iris recognition device, a hand geometrics recognition device, a retina recognition device, a voice ID recognition device.

The additional cryptographic token may further comprise an unlocking mechanism for unlocking by the mobile device container. The unlocking mechanism may initiate a graphical user interface which may prompt a user of the mobile device container to PIN entering or fingerprint scanning.

Another aspect of the invention relates to a smart card. The smart card comprises cryptographic logic, a central processing unit, a communication interface which is configured to communicate with a mobile device container and memory. The memory may comprise volatile memory, such as RAM, and/or non-volatile memory, such as Flash, EEPROM. The mobile device container is configured to isolate processes and data of a mobile device from other processes and data of the mobile device, and the mobile device container is also configured to establish a secure connection to a number of VPN, each VPN having a VPN profile. The smart card is configured to provide, using cryptographic logic, upon request of the mobile device container, at least part of a VPN profile of a VPN of the number of VPN.

The VPN profile provided by the smart card may comprise at least one of the following: a challenge response authentication, user identification (ID), mobile device ID, mobile device container ID, a cryptographic key, an encrypted key, a private key, a public key, a certificate, public key certificate, generic secret, personal identification number (PIN), password, one-time password, API key, API token, biometric identification, fingerprint identification, palm veins identification, face identification, DNA identification, palmprint identification, iris identification, hand geometrics identification, retina identification, voice ID identification, VPN server information, port number, hostname, network address, target system, configuration information, time-out information, compression information, IP address, identification number. The VPN profile provided by the smart card may be provided in plaintext and/or cyphertext.

The smart card may be further configured, upon a subsequent request of the mobile device container, to selectively provide at least part of a subsequent VPN profile only if the mobile device container successfully established a secure connection to the VPN.

The smart card may further comprise an unlocking mechanism for unlocking by the mobile device container.

The smart card may also be configured to receive updates of the memory and/or cryptographic logic that are stored on the mobile device container and forwarded to the smart card through the communication interface.

Another aspect of present invention relates to a mobile device container. The mobile device container is configured to isolate a portion of the mobile device from another portion of the mobile device. The mobile device container comprises a first interface which is configured to securely connect to a number of VPN, and a second interface which is configured to communicate with an integrated circuit card (ICC). The ICC is configured to provide at least part of a VPN profile of a VPN of the number of VPN. For establishing a secure connection to the VPN of the number of VPN over the first interface, the mobile device container is configured to access at least part of the VPN profile of the VPN of the number of VPN over the second interface.

The mobile device container may be further configured to prompt a user to enter an authentication code for unlocking the ICC.

Another aspect of present invention relates to a method for establishing a secure connection between a mobile device container and a number of VPN. The mobile device container is configured to isolate a portion of a mobile device from another portion of the mobile device. The method comprises the steps of
    accessing at least part of a VPN profile of a VPN of the number of VPN from a smart card, wherein the step of accessing at least part of a VPN profile further comprises cryptographic processes,
    connecting to the VPN.
The method may further comprise the steps of
    accessing at least part of a VPN profile of a subsequent VPN of the number of VPN selectively provided upon successful connection to the VPN by at least one of
        the smart card,
        the mobile device container,
        the VPN of the number of VPN,
        the communication link,
        a cryptographic token,
    connecting to the subsequent VPN.

"Cryptographic processes" may be used herein to indicate any of decrypting or encrypting processes, creating digital signatures, key exchange mechanisms (e.g. Diffie-Hellman key exchange) or creating message authentication codes using symmetric or asymmetric cryptography. Such cryptographic processes may comprise using a smartcard.

The step of accessing at least part of a VPN profile may as well comprise extracting at least part of the VPN profile. After extracting, the at least part of the VPN profile may be stored within the mobile device container and thereby made permanently accessible. This may for instance be the case for smart cards configured for single use.

BRIEF DESCRIPTION OF THE DRAWINGS

Features of examples will be described, by way of example, in the following detailed description with reference to the accompanying drawings in, which like reference numerals correspond to similar, though perhaps not identical, components. For the sake of brevity, reference numerals or features having a previously described function may or may not be described in connection with other drawings in, which they appear.

Non-limiting examples will now be described with reference to the accompanying drawings, in, which.

DETAILED DESCRIPTION

Figure 1:
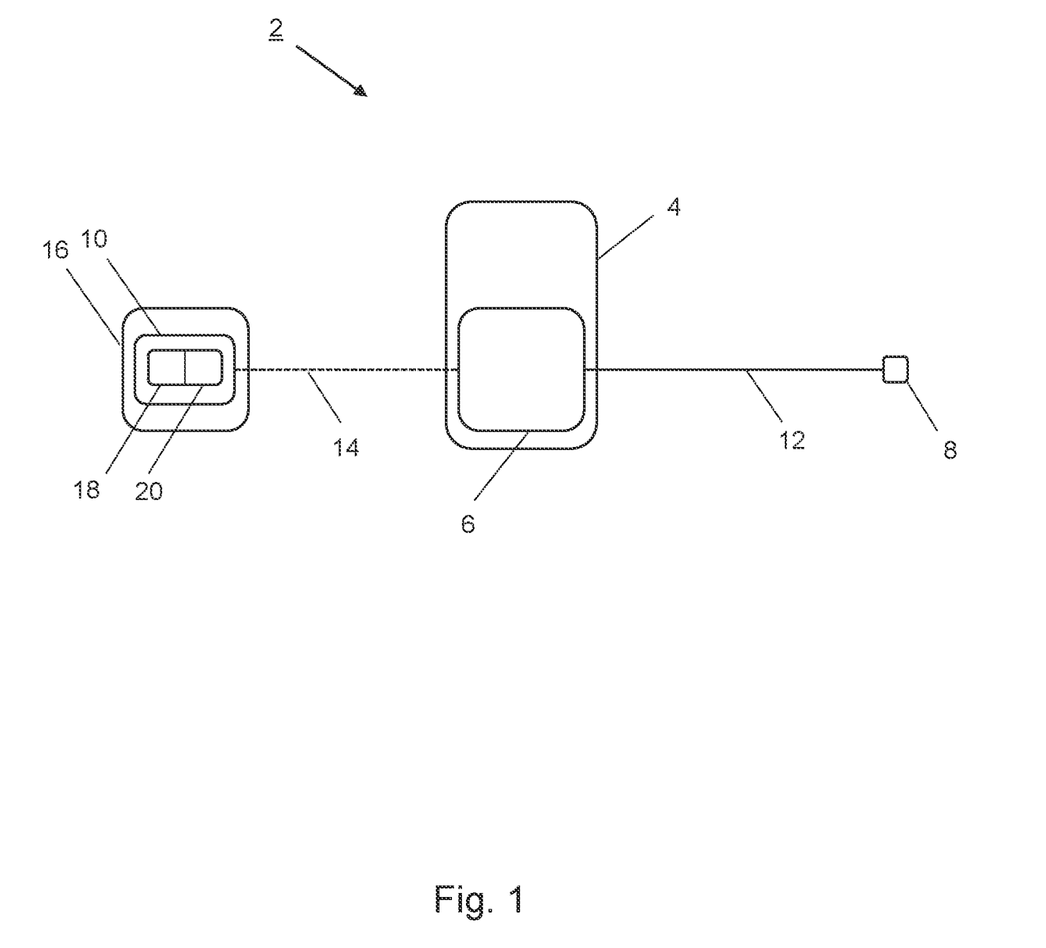
FIG. 1 shows a schematic illustration of an exemplary system for establishing a secure connection between a mobile device container and a number of VPN.

FIG. 1 shows a simplified, schematic illustration of a system 2 for establishing a secure connection 12 between a mobile device container 6 which is implemented in a mobile device 4 and a number of VPN 8. In FIG. 1, the number of VPN 8 is equal to one VPN. The system 2 comprises a cryptographic token 10. The cryptographic token is provided on a smart card 16. The cryptographic token 10 provides a VPN profile 18, 20. The VPN profile includes VPN server information 18 which, for instance, indicates a target network address. The VPN profile further includes an authentication key 20 for authentication of the mobile device container 6 towards the VPN 8. The cryptographic token 10 and the mobile device container 6 are linked by a communication link 14. In order to establish a secure connection 12 to the VPN, the mobile device container 6 accesses the VPN server information 18 and the authentication key 20 from the cryptographic token 10 through the communication link 14. The mobile device container 6 extracts and stores the VPN server information 18 and the authentication key 20 for permanent accessibility.

Figure 2:
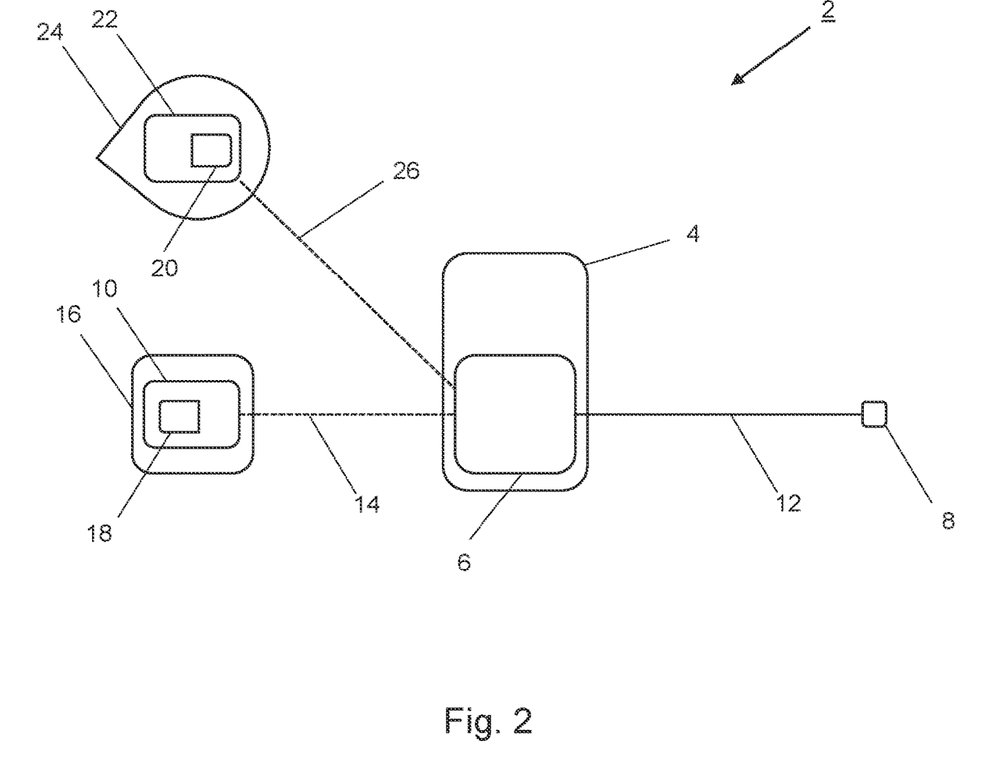
FIG. 2 shows a schematic illustration of an exemplary system for establishing a secure connection between a mobile device container and a VPN including two cryptographic tokens.

FIG. 2 shows another schematic example of the system 2 for establishing a secure connection between a mobile device container 6 and a number of VPN 8 which comprises two cryptographic tokens 10, 22. Here, the number of VPN 8 is also equal to one. One cryptographic token 10 is provided by the smart card 16 and includes VPN server information 18. The mobile device container 6 and cryptographic token 10 are linked by the communication link 14. Another cryptographic token 22 is provided by a near field communication medium 24 and includes the authentication key 20. The mobile device container 6 and cryptographic token 22 are linked by communication link 26. In order to securely connect to the VPN of the number of VPN 8, mobile device container 6 accesses VPN server information 18 from cryptographic token 10 through communication link 14, and the authentication key 20 from cryptographic token 22 through communication link 26. Either of the cryptographic tokens 10, 22, or the mobile device container 6 indicates where to find the different parts of the VPN profile (not shown).

Figure 3A:
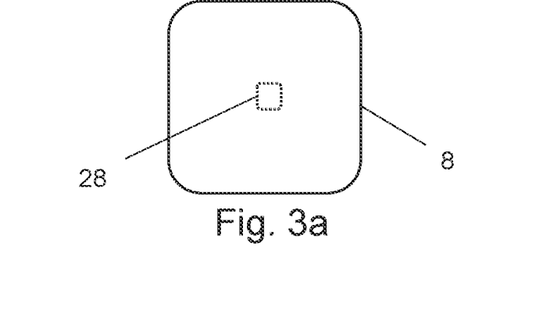
FIG. 3a-3c show schematic illustrations of exemplary configurations of a number of VPN.
Figure 3B:
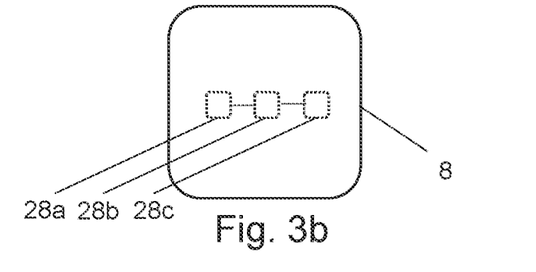
Figure 3C:
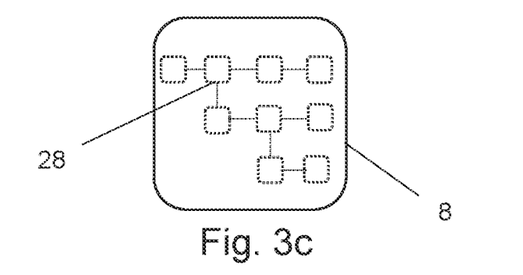

FIGS. 3a to 3c illustrate exemplary configurations of the number of VPN 8. In FIG. 3a, the number of VPN comprises one VPN 28. Thus, one VPN profile is necessary for establishing a secure connection to this one VPN 28.

FIG. 3b shows a multi-hop VPN configuration with three subsequent VPN 28a, 28b, 28c. For example, the three subsequent VPN 28a, 28b, 28c correspond to different VPN within a company, government, educational institution, or other entity. VPN 28a corresponds to the main VPN of the entity, VPN 28b corresponds to a department VPN of the entity, while 28c corresponds to a team VPN. Parts of the VPN profile of the respective subsequent VPN are provided by the preceding VPN upon successful connection of the mobile device container to the preceding VPN (not shown). For instance, VPN server information of VPN 28b are provided by VPN 28a once a secure connection has been established to the VPN 28a.

FIG. 3c shows a cascading VPN configuration of the number of VPN 8. Here, specific VPN 28 branch out to more than one subsequent VPN.

Figure 4:
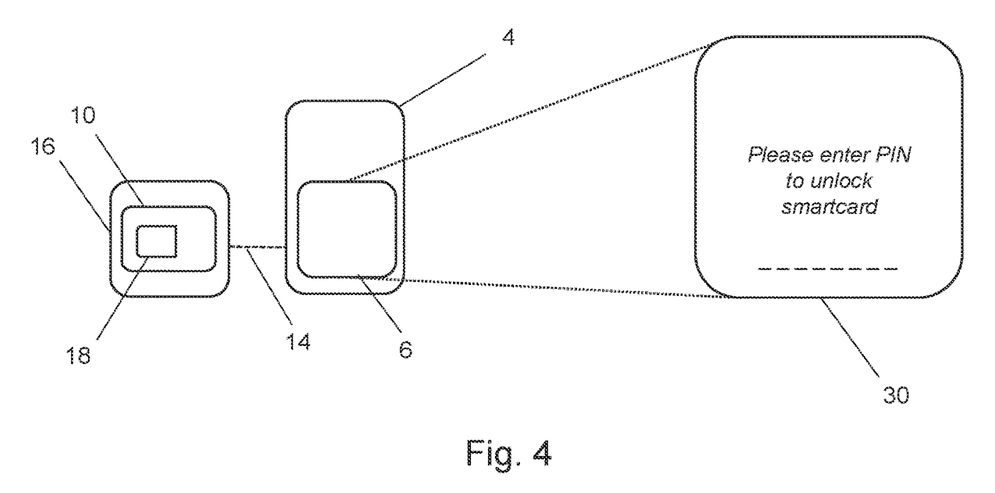
FIG. 4 shows a simplified graphical user interface of an exemplary unlocking mechanism of a cryptographic token.

FIG. 4 illustrates an exemplary simplified graphical user interface of an unlocking mechanism 30 of the smart card 16. The graphical user interface 30 prompts a user of the mobile device container 6 to enter a PIN in order to unlock the smartcard. Upon successful PIN entry, the mobile device container 6 can access the cryptographic token 10 provided by the smart card 16 through the communication link 14.

Figure 5:
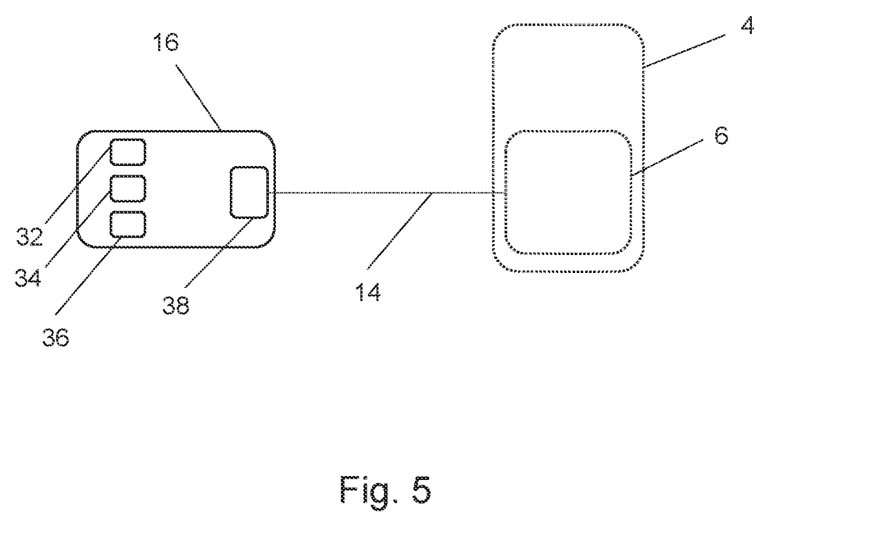
FIG. 5 shows a schematic illustration of an exemplary smart card.

FIG. 5 shows a schematic illustration of an example of a smart card 16. The smart card 16 comprises memory 32, cryptographic logic 34, a central processing unit 36, and a communication interface 38. The communication interface 38 is configured for wired or wireless communication through communication link 14 with a mobile device container 6 of a mobile device 4. The smart card 16 provides, upon request of the mobile device container 6, at least part of a VPN profile from the memory 32.

Figure 6:
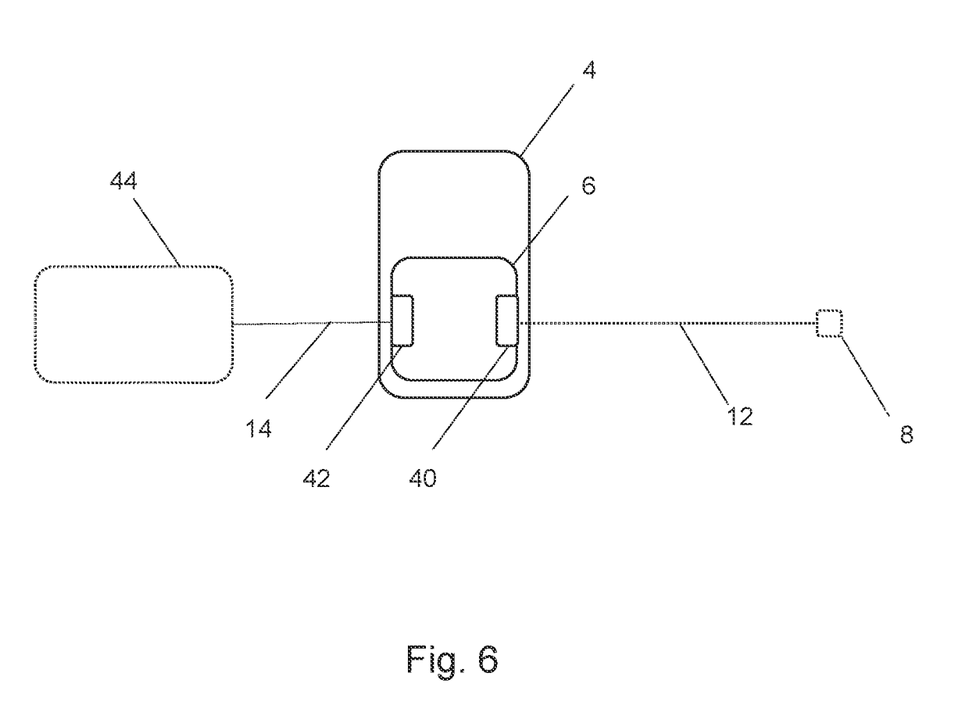
FIG. 6 shows a schematic illustration of an exemplary mobile device container comprising two interfaces.

FIG. 6 shows a schematic illustration of an exemplary mobile device container 6 with two interfaces 40, 42. The mobile device container 6 is implemented within a mobile device 4. The first interface 40 is configured for connecting over a secure connection 12 to a number of VPN 8. The second interface 42 is configured for communication to an ICC. The mobile device container 4 accesses at least part of a VPN profile of a VPN of the number of VPN 8 from the ICC 44 over the second interface 42. Thereafter, the mobile device container 6 connects to the VPN of the number of VPN 8 over the first interface 40.

Figure 7:
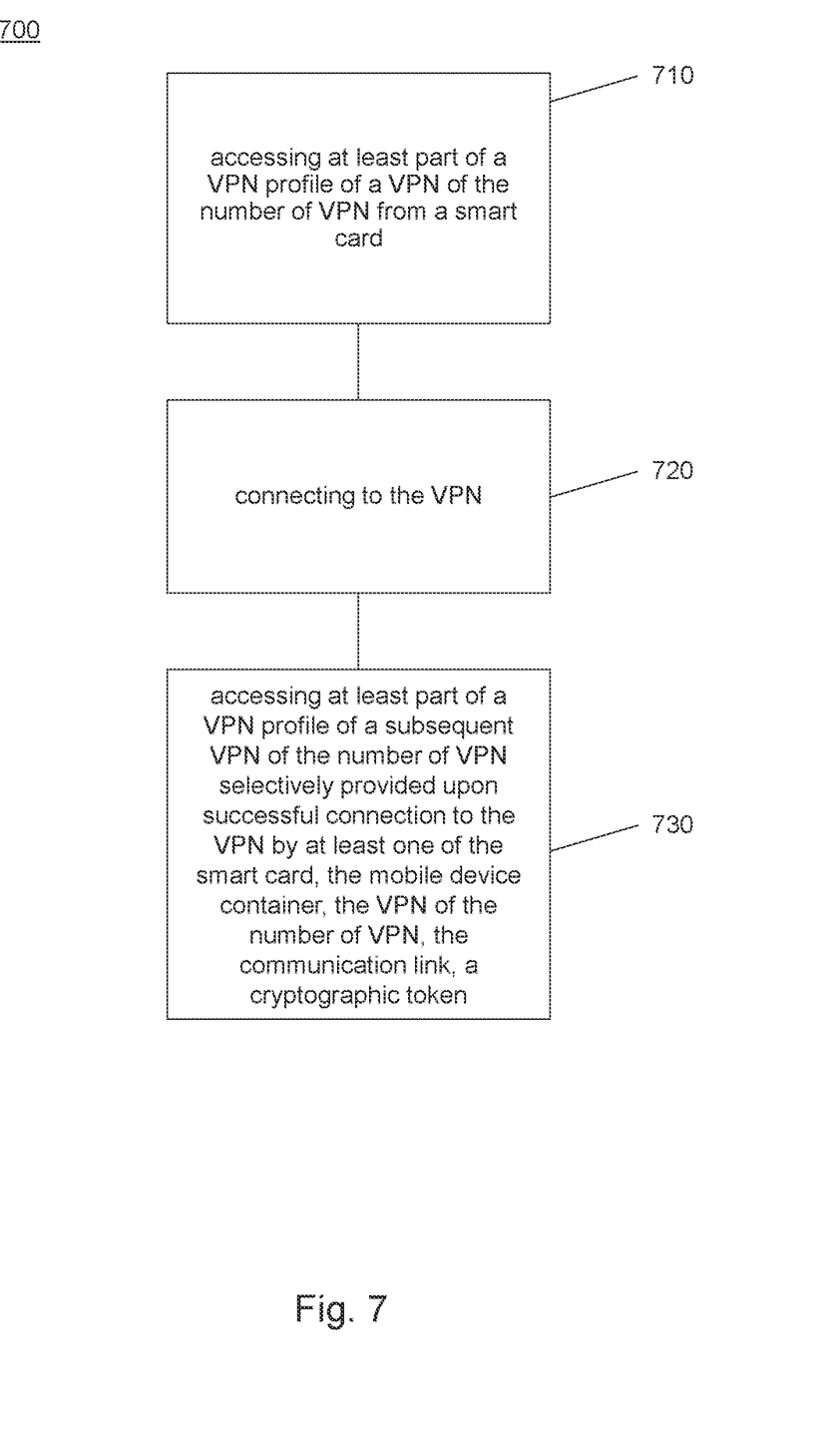
FIG. 7 and FIG. 8 relate to exemplary methods for establishing a secure connection between a mobile device container and a number of VPN.
Figure 8:
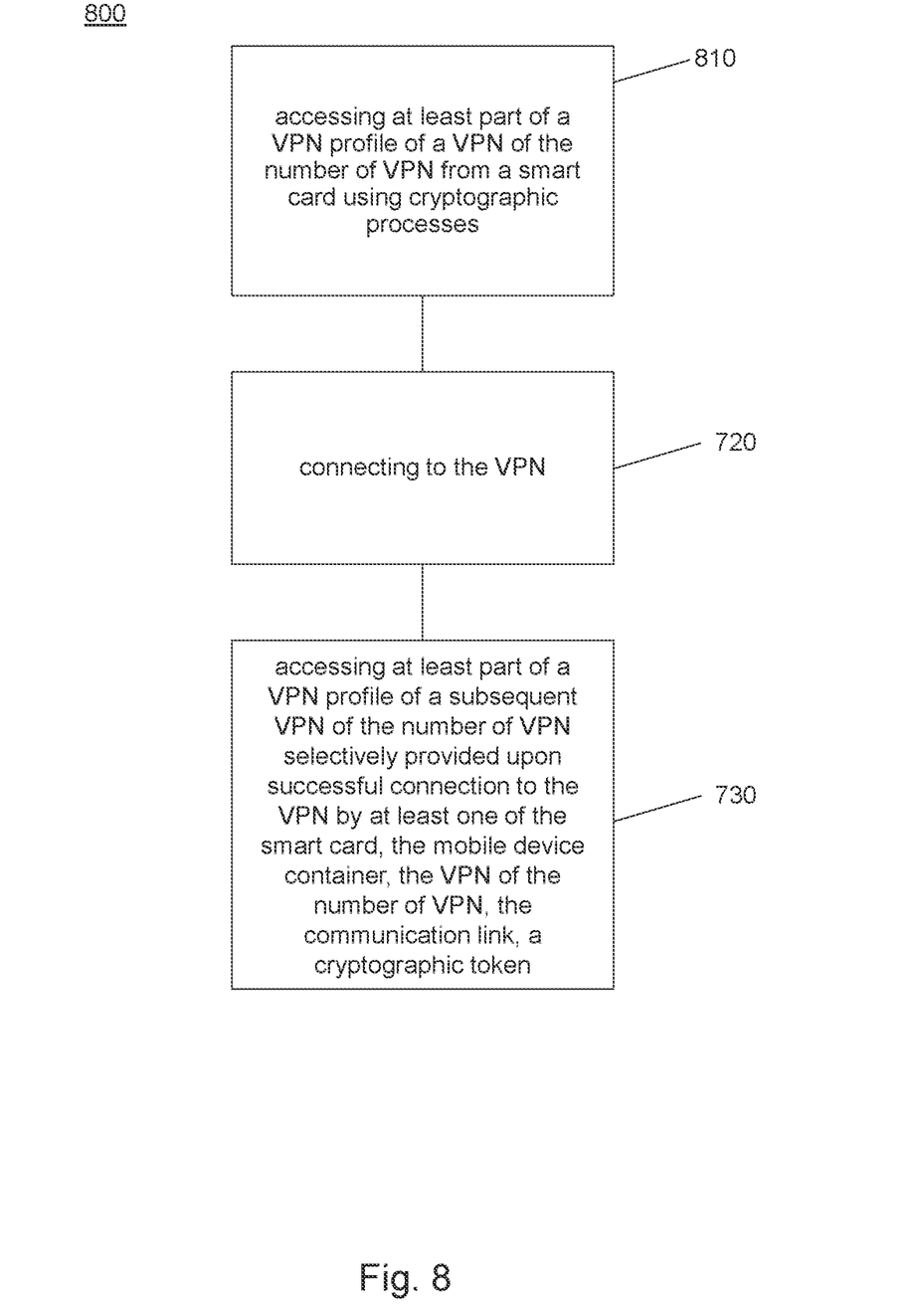

FIG. 7 and FIG. 8 relate to exemplary method 700, 800 for establishing a secure connection between a mobile device container and a number of VPN. In FIG. 7, method 700 comprises the step 710 of accessing at least part of a VPN profile of a VPN of the number of VPN from a smart card. Method 700 further comprises the step 710 of connecting to the VPN. Thereafter, in step 720, at least part of a VPN profile of a subsequent VPN of the number of VPN is accessed which is selectively provided upon successful connection to the VPN by at least one of the smart card, the mobile device container, the VPN of the number of VPN, the communication link, a cryptographic token. The method further comprises connecting to the subsequent VPN in step 730.

FIG. 8 shows another method 800 which comprises method 700. In addition thereto, the first step 810 which relates to accessing at least part of a VPN profile of a VPN of the number of VPN from a smart card also comprises cryptographic processes.

| List of reference signs | |
| --- | --- |
| 2 | system for establishing a secure connection between a mobile device container and a VPN |
| 4 | mobile device |
| 6 | mobile device container |
| 8 | a number of VPN |
| 10 | cryptographic token |
| 12 | secure connection |
| 14 | communication link |
| 16 | smart card |
| 18 | VPN server information |

-continued

List of reference signs

| | |
|---|---|
| 20 | authentication key |
| 22 | additional cryptographic token |
| 24 | NFC chip |
| 26 | additional communication link |
| 28 | VPN |
| 28a, 28b, 28c | subsequent VPN |
| 30 | graphical user interface of unlocking mechanism |
| 32 | memory |
| 34 | cryptographic logic |
| 36 | central processing unit |
| 38 | communication interface |
| 40 | first interface |
| 42 | second interface |
| 44 | integrated circuit card |

The invention claimed is:

1. A system for establishing a secure connection between a mobile device container and a number of virtual private networks (VPN), comprising:
a number of VPN, each VPN of the number of VPN having a VPN profile;
a cryptographic token, configured to provide at least a first part of the VPN profile of at least one first VPN of the number of VPN; and
a communication link, configured to link the mobile device container and the cryptographic token, the mobile device container to isolate a portion of a mobile device from another portion of the mobile device;
memory to store the VPN profile;
wherein, to establish a secure connection to the at least one first VPN of the number of VPN, the mobile device container is configured to access at least the first part of the VPN profile of the at least one first VPN of the number of VPN through the communication link configured to link the mobile device container and the cryptographic token, wherein, to establish a secure connection to a subsequent VPN, the system is further configured to selectively provide at least a first part of the VPN profile of the subsequent VPN only if the connection between the mobile device container and the at least one first VPN has been successfully established.

2. The system according to claim 1, wherein the number of VPN is configured to any of
a multi-hop VPN,
a double-hop VPN,
a chaining VPN,
a cascading VPN,
subsequent VPN.

3. The system according to claim 2, wherein the system is configured to provide a second part of the VPN profile of the at least one first VPN of the number of VPN to establish a secure connection to the at least one first VPN of the number of VPN, wherein at least one of
the mobile device container,
the VPN of the number of VPN,
the communication link,
is configured to provide the second part of the VPN profile.

4. The system according to claim 3, further comprising:
an additional cryptographic token, configured to provide the further second part of the VPN profile of the at least one of the number of VPN;
an additional communication link, configured to link the mobile device container and the additional cryptographic token;

wherein, to establish a secure connection to the at least one first VPN of the number of VPN, the mobile device container is configured to access the second part of the VPN profile of the at least one first VPN of the number of VPN from at least one of
the mobile device container,
the VPN of the number of VPN,
the communication link,
the additional cryptographic token.

5. The system according to claim 4, wherein at least the first part of the VPN profile of the subsequent VPN is selectively provided by at least one of
the cryptographic token,
the mobile device container,
the VPN of the number of VPN,
the communication link,
the additional cryptographic token,
the additional communication link.

6. The system according to claim 5, wherein the VPN profile of each VPN of the number of VPN comprises at least one of:
a challenge response authentication,
user identification (ID),
mobile device ID,
mobile device container ID,
a cryptographic key,
an encrypted key,
a private key,
a public key,
a certificate,
public key certificate,
generic secret,
personal identification number (PIN),
password,
one-time password,
application programming interface (API) key,
API token,
biometric identification,
fingerprint identification,
palm veins identification,
face identification,
DNA identification,
palmprint identification,
iris identification,
hand geometrics identification,
retina identification,
voice ID identification,
VPN server information,
port number,
hostname,
network address,
target system,
configuration information,
time-out information,
compression information,
IP address,
identification number
in at least one of
plaintext
cyphertext.

7. The system according to claim 6, wherein the cryptographic token is provided by at least one of:
a smart card,
an integrated circuit card (ICC),
a universal serial bus (USB) medium,
a quick response (QR) code,
an optical medium, an audio medium,
a photographic medium,
a holographic medium,
a transaction authentication number (TAN) generator,
a smart watch,
a near field communication (NFC) medium,
a radio-frequency identification (RFID) medium,
a user,
and wherein the communication link comprises at least one of
Bluetooth,
a wired card reader,
a wireless card reader,
NFC,
RFID,
a body area network (BAN),
a biometric recognition device,
an optical recognition device,
a QR recognition device,
a fingerprint recognition device,
a palm veins recognition device,
a face recognition device,
a DNA recognition device,
a palmprint recognition device,
an iris recognition device,
a hand geometrics recognition device,
a retina recognition device,
a voice ID recognition device.

8. A smart card, comprising:
memory,
cryptographic logic,
a central processing unit,
a communication interface configured to communicate with a mobile device container, wherein the mobile device container is configured to a isolate first process and data of a mobile device from a second process and data of the mobile device, and wherein the mobile device container is configured to establish a secure connection to at least one first VPN of a number of VPN, each VPN having a VPN profile,
wherein the smart card is configured to provide, using the cryptographic logic, upon request of the mobile device container, at least a first part of a VPN profile of the at least one first VPN of the number of VPN, wherein the smart card is further configured, upon a subsequent request of the mobile device container, to selectively provide at least a first part of a subsequent VPN profile only if the mobile device container successfully established a secure connection to the at least one first VPN.

9. The smart card according to claim 8, wherein the VPN profile comprises at least one of the following:
a challenge response authentication,
user identification (ID),
mobile device ID,
mobile device container ID,
a cryptographic key,
an encrypted key,
a private key,
a public key,
a certificate,
public key certificate,
generic secret,
personal identification number (PIN),
password,
one-time password,
API key,
API token,
biometric identification,
fingerprint identification,
palm veins identification,
face identification,
DNA identification,
palmprint identification,
iris identification,
hand geometrics identification,
retina identification,
voice ID identification
VPN server information,
port number,
hostname,
network address,
target system,
configuration information,
time-out information,
compression information,
IP address,
identification number,
in at least one of
plaintext
cyphertext.

10. A mobile device comprising hardware configured to isolate a portion of the mobile device from another portion of the mobile device, the mobile device comprising:
a first interface, configured to securely connect to a number of VPN,
a second interface, configured to communicate with an integrated circuit card (ICC), wherein the ICC is configured to provide at least a first part of a VPN profile of a first VPN of the number of VPN,
wherein, for establishing a secure connection to the first VPN of the number of VPN over the first interface, the mobile device is configured to access at least a first part of the VPN profile of the first VPN of the number of VPN over the second interface, wherein, to establish a secure connection to a subsequent VPN, the mobile device is further configured to selectively provide at least a first part of the VPN profile of the subsequent VPN only if the connection between a mobile device container and the first VPN has been successfully established.

11. The mobile device according to claim 10, wherein the VPN profile of the first VPN comprises at least one of the following:
a challenge response authentication,
user identification (ID),
mobile device ID,
mobile device container ID,
a cryptographic key,
an encrypted key,
a private key,
a public key,
a certificate,
public key certificate,
generic secret,
personal identification number (PIN),
password,
one-time password,
API key,
API token,
biometric identification,
fingerprint identification,
palm veins identification,
face identification,
DNA identification,
palmprint identification, iris identification,
hand geometrics identification,
retina identification,
voice ID identification
VPN server information,
port number,
hostname,
network address,
target system,
configuration information,
time-out information,
compression information,
IP address,
identification number,
in at least one of
    plaintext
    cyphertext.

12. A method for establishing a secure connection between a mobile device container, configured to isolate a portion of a mobile device from another portion of the mobile device, and a number of virtual private network (VPN), comprising:
    accessing at least a first part of a VPN profile of at least one first VPN of the number of VPN from a smart card, wherein accessing at least the first part of the VPN profile of the at least one first VPN of the number of VPN further comprises cryptographic processes;
    connecting to the at least one first VPN;
    accessing at least a first part of a VPN profile of a subsequent VPN of the number of VPN selectively provided upon successful connection to the at least one first VPN by at least one of
        the smart card,
        the mobile device container,
        the VPN of the number of VPN,
        a communication link,
        a cryptographic token, and
    connecting to the subsequent VPN.

13. The system according to claim 1, wherein the system is configured to provide a second part of the VPN profile of the at least one first VPN of the number of VPN to establish a secure connection to the at least one first VPN of the number of VPN, wherein at least one of
    the mobile device container,
    the VPN of the number of VPN,
    the communication link,
is configured to provide the second part of the VPN profile.

14. The system according to claim 1, wherein the VPN profile of each of the number of VPN comprises at least one of:
    a challenge response authentication,
    user identification (ID),
    mobile device ID,
    mobile device container ID,
    a cryptographic key,
    an encrypted key,
    a private key,
    a public key,
    a certificate,
    public key certificate,
    generic secret,
    personal identification number (PIN),
    password,
    one-time password,
    application programming interface (API) key,
    API token,
    biometric identification,
    fingerprint identification,
    palm veins identification,
    face identification,
    DNA identification,
    palmprint identification,
    iris identification,
    hand geometrics identification,
    retina identification,
    voice ID identification,
    VPN server information,
    port number,
    hostname,
    network address,
    target system,
    configuration information,
    time-out information,
    compression information,
    IP address,
    identification number
in at least one of
    plaintext
    cyphertext.

15. The system according to claim 1, wherein the cryptographic token is provided by at least one of:
    a smart card,
    an integrated circuit card (ICC),
    a universal serial bus (USB) medium,
    a quick response (QR) code,
    an optical medium,
    an audio medium,
    a photographic medium,
    a holographic medium,
    a transaction authentication number (TAN) generator,
    a smart watch,
    a near field communication (NFC) medium,
    a radio-frequency identification (RFID) medium,
    a user,
and wherein the communication link comprises at least one of
    Bluetooth,
    a wired card reader,
    a wireless card reader,
    NFC,
    RFID,
    a body area network (BAN),
    a biometric recognition device,
    an optical recognition device,
    a QR recognition device,
    a fingerprint recognition device,
    a palm veins recognition device,
    a face recognition device,
    a DNA recognition device,
    a palmprint recognition device,
    an iris recognition device,
    a hand geometrics recognition device,
    a retina recognition device,
    a voice ID recognition device.

* * * * *